(12) United States Patent
Kusic

(10) Patent No.: US 7,753,310 B2
(45) Date of Patent: *Jul. 13, 2010

(54) TANDEM POWERED POWER TILTING AIRCRAFT

(76) Inventor: Tom Kusic, P.O. Box 932, Melbourne, VIC. (AU) 3001

( * ) Notice: Subject to any disclaimer, the term of this patent is extended or adjusted under 35 U.S.C. 154(b) by 369 days.

This patent is subject to a terminal disclaimer.

(21) Appl. No.: 11/584,620

(22) Filed: Oct. 23, 2006

(65) Prior Publication Data

US 2007/0034735 A1 Feb. 15, 2007

Related U.S. Application Data

(62) Division of application No. 10/518,477, filed on Dec. 20, 2004, now Pat. No. 7,306,186.

(51) Int. Cl.
*B64C 27/52* (2006.01)
*B64C 27/00* (2006.01)

(52) U.S. Cl. .............. 244/17.25; 244/12.4; 244/56

(58) Field of Classification Search ............ 244/7 C, 244/12.3, 12.4, 17.19, 17.23, 17.25, 23 B, 244/56

See application file for complete search history.

(56) References Cited

U.S. PATENT DOCUMENTS

| | | | |
|---|---|---|---|
| 1,491,310 | A | 4/1924 | Perrin |
| 2,138,999 | A | 12/1938 | Clark |
| 2,233,747 | A | 3/1941 | Reidl |
| D153,315 | S | 4/1949 | Piasecki |
| 2,629,568 | A | 2/1953 | Croshere, Jr. et al. |
| 2,969,935 | A | 1/1961 | Price |
| 3,219,120 | A | 11/1965 | Hooper |
| 3,231,221 | A | 1/1966 | Platt |
| 3,278,138 | A | 10/1966 | Haberkorn |
| 3,282,534 | A | 11/1966 | Srriades |
| 3,298,633 | A | 1/1967 | Dastoli et al. |
| 3,311,327 | A | 3/1967 | Greulich |
| 3,360,217 | A | 12/1967 | Trotter |
| 3,404,852 | A | 10/1968 | Sambell |
| 3,405,890 | A | 10/1968 | Eickman |
| 3,514,051 | A | 5/1970 | Celayan |
| 3,592,412 | A | 7/1971 | Glatfelter |
| 3,797,783 | A | 3/1974 | Kisovec |
| 3,905,565 | A | 9/1975 | Kolwey |

(Continued)

FOREIGN PATENT DOCUMENTS

AU  2002/18828 A1  9/2002

(Continued)

*Primary Examiner*—Rob Swiatek

(57) ABSTRACT

An aircraft with a long body 1 which has a forward end 2 and an aft end 3, which is able to achieve vertical take-off by means of a tilt-able rotor and blade assembly 4 at the forward part of the aircraft and a tilt-able turbojet 19 at the rear of the aircraft. The rotor and blade assembly is rotated by an engine assembly 8, with the engine assembly, the rotor and blades all positioned on top a multi-directional tilt enabling joint 9. The turbojet is fitted to a multi-directional tilt enabling joint 27 to allow control of lateral movement of the aircraft as well as providing vertical lift and forward propulsion during forward flight. The turbojet is connected to the tilt enabling joint 27 by a rivet 30 such that the turbojet can be rotated relative to the tilt enabling joint.

14 Claims, 7 Drawing Sheets

U.S. PATENT DOCUMENTS

| | | |
|---|---|---|
| 3,985,320 A | 10/1976 | Brady |
| 4,032,084 A | 6/1977 | Black |
| 4,537,372 A | 8/1985 | Forizs |
| 4,982,914 A | 1/1991 | Eickmann |
| 5,085,315 A | 2/1992 | Sambell |
| 5,709,357 A | 1/1998 | Von Wilmowsky |
| 5,868,351 A | 2/1999 | Stamps et al. |
| 6,019,578 A | 2/2000 | Hager et al. |
| 6,089,501 A | 7/2000 | Frost |
| 6,293,491 B1 | 9/2001 | Wobben |
| 6,340,133 B1 | 1/2002 | Capanna |
| 6,367,736 B1 | 4/2002 | Pancotti |
| 6,581,872 B2 | 6/2003 | Walmsley |
| 6,592,071 B2 | 7/2003 | Kinkead et al. |
| 2002/0100835 A1 | 8/2002 | Kusic |
| 2003/0094537 A1 | 5/2003 | Austen-Brown |
| 2003/0106959 A1 | 6/2003 | Fukuyama |
| 2006/0157616 A1 | 7/2006 | Kusic |

FOREIGN PATENT DOCUMENTS

| | | |
|---|---|---|
| CA | 2376/26 A1 | 9/2002 |

TANDEM POWERED POWER TILTING AIRCRAFT

CROSS REFERENCE TO RELATED APPLICATIONS

This is a divisional patent application, being a division of the U.S. patent application Ser. No. 10/518,477 filed Dec. 20, 2004 now U.S. Pat. No. 7,306,186.

STATEMENT REGARDING FEDERALLY SPONSORED RESEARCH OR DEVELOPMENT

Not applicable.

REFERENCE TO SEQUENCE LISTING

Not applicable.

TECHNICAL FIELD

This invention relates to the vertical take-off field of aviation.

BACKGROUND ART

Many versions of helicopters using tandem rotors have been constructed to date. What has been common to all such helicopters is that the lifting rotors have had to have variable pitch blades to allow control of the helicopters.

SUMMARY OF THE INVENTION

This invention provides an aircraft that can take-off and land in a similar manner to a tandem rotor helicopter and then fly like a conventional airplane. The aircraft does not require a blade pitch varying mechanism and has a greater chance of surviving an attack by a heat seeking missile, a rocket propelled grenade or anti-aircraft artillery than a conventional helicopter or a tandem rotor helicopter. The aircraft can also fly faster than a conventional or a tandem rotor helicopter, and has the potential to carry cargo weights exceeding that of existing tandem rotor helicopters. The aircraft comprises a multi-directional tilt-able rotor at the front and at least one jet engine at the rear that is connected by a tilt enabling joint to the main body of the aircraft. The jet is connected to the tilt enabling joint such that the jet can be rotated on the tilt enabling joint.

BRIEF DESCRIPTION OF THE DRAWINGS

Embodiments of the invention will now be described by way of example with reference to the accompanying drawings, of which.

DETAILED DESCRIPTION OF THE INVENTION

Figure 1:
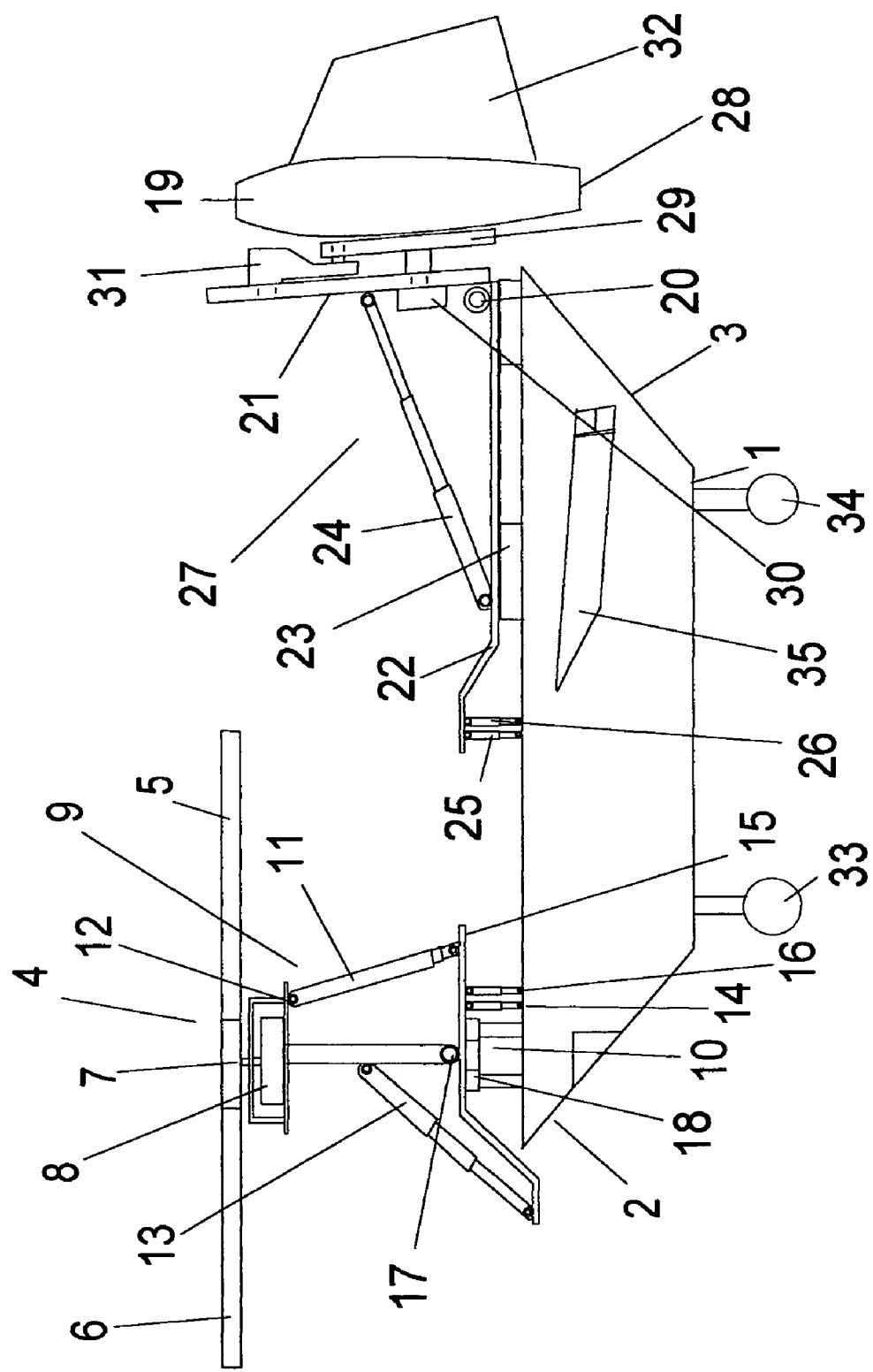
FIG. 1 shows one form of aircraft according to this invention, comprising a tilt-able rotor at the front of the main body and a jet at the rear of the main body of that aircraft able to be tilted in forward, rearward and lateral directions, and rotated relative to the main body of the aircraft. The drawing shows the aircraft in vertical take-off mode.

The aircraft has a main body that is longer than it is wider, a lifting mechanism at the front, which is a primary lifting mechanism, and another lifting mechanism at the rear, which is a secondary lifting mechanism. The primary lifting mechanism is joined to the forward part of the main body of the aircraft by a tilt enabling joint such that the primary lifting mechanism can be tilted in forward, rearward and lateral directions in a controlled manner. The secondary lifting mechanism is joined to the aft part of the main body of the aircraft by another tilt enabling joint such that the secondary lifting mechanism can be tilted in forward, rearward and lateral directions in a controlled manner.

The tilt enabling joints provide the means to position the lifting mechanisms above the main body of the aircraft and the means to tilt the primary and secondary lifting mechanisms in a plurality of directions and angles in a controlled manner relative to the main body of the aircraft. Referring to the tilt enabling joint that can tilt the primary lifting mechanism as a primary tilt enabling joint, the primary lifting mechanism can be tilted forward, rearward, and from side to side with respect to the main body of the aircraft by means of the primary tilt enabling joint. And referring to the tilt enabling joint that can tilt the secondary lifting mechanism as a secondary tilt enabling joint, the secondary lifting mechanism can be tilted forward, rearward, and from side to side with respect to the main body of the aircraft by means of the secondary tilt enabling joint.

Tilting of the lifting mechanisms is used as a means to control the aircraft instead of varying blade pitches. By using tilting of lifting mechanisms to control the aircraft during flight, combinations of different forms of lifting mechanisms can be used. For example, the front lifting mechanism can be in the form of a rotor with fixed pitch blades and an engine assembly, with the blades able to force air in a downward direction. The front lifting mechanism can also be in the form of a turboprop. The rear lifting mechanism can be a jet engine which can force exhaust gas from the jet engine to travel directly downward or downward and sideways, depending on the tilting of the jet. By being able to tilt the jet forward and rearward, and from side to side, changes in direction of exhaust gas can be achieved. Side-way directed exhaust gas can be used to counter the torque of the forward rotor during vertical take off. Because the aircraft has a jet at the rear instead of a rotor, the down-wash over the rear part of the body of the aircraft from rotor blades is avoided. As such wings can be fitted to the rear of the aircraft. On conventional helicopters wings have been proven to be useless due to down-wash from rotor blades. With wings fitted to the current invention, the aircraft could gain substantial lift during high speed forward flight, reducing the need to rely on the jet at the rear for lift. The forward lifting mechanism could be tilted 90 degrees forward during forward flight, thus overcoming the need for a lateral counter torque mechanism during high speed forward flight. The jet can then be tilted into a horizontal position, adding to forward propulsion. The aircraft can in effect be transformed from a vertical take-off aircraft into a high speed forward flying airplane, using a massive sized rotor at the front acting as a propeller on an airplane (hence overcoming the speed constraints that conventional helicopters are subject to) and a jet at the rear for forward propulsion. The wings would provide lift, enabling fuel efficient flight and hence a greater range than conventional helicopters. The ailerons on the wings could counter the torque from the main rotor during high speed forward flight.

The front rotor could potentially be as large as the type that is used on the Sikorsky CH53E Super Stallion, and powered by three jet engines as is the CH53E. Instead of using one jet engine at the rear, the aircraft could be constructed with two Rolls-Royce Pegasus jet engines, the type of jet engine found on the McDonnell Douglas/BAe Harrier 11. The cargo lifting ability of the CH53E is approximately 16,000 kilograms. The Harrier, with a single jet engine has a maximum gross take-off weight of approximately 14,000 kilograms, and an empty take-off weight of approximately 6500 kilograms. Accordingly, it becomes apparent that the aircraft described, with a tilt rotor in the front and tilt-able jets at the rear, has the potential to lift vertically cargo exceeding 20,000 kilograms in weight, and transport such heavy cargo efficiently over long distances.

By having two separate means for forward propulsion arranged in tandem order, which are able to operate independently of one another, the aircraft would have a greater chance of surviving an attack by a heat seeking missile, a rocket propelled grenade or anti-aircraft artillery than a conventional type of helicopter or a tandem rotor helicopter. If the forward lifting mechanism is destroyed, the jet at the rear could continue to provide forward propulsion. Alternatively, if the jet engine at the rear is destroyed, the rotor at the front could provide forward propulsion.

With the primary lifting mechanism at the front of the aircraft comprising a rotor with a plurality of blades connected to the rotor, and the rotor being rotated by an engine assembly to force air to travel in a downward direction, the engine assembly can consist of a single engine or a plurality of engines.

Since the rotor blades don't have to be varied as in a conventional helicopter, a simple option could be to use a turboprop as the primary lifting mechanism, positioned on the primary tilt enabling joint such that during take-off air is forced in a downward direction by means of the blades that form part of the turboprop.

In one form of the aircraft the primary lifting mechanism comprises an engine assembly, a rotor, and blades connected to the rotor, with the engine assembly able to rotate the rotor and the blades connected to the rotor such that air can be forced to travel in a downward direction by means of the blades rotating around the rotor, and the secondary lifting mechanism is a jet engine in the form of a turbojet that can be tilted so that exhaust gas from the turbojet can be forced in a downward direction behind the main body of the aircraft.

In another form of the aircraft the primary lifting mechanism comprises an engine assembly, a rotor, and blades connected to the rotor, with the engine assembly able to rotate the rotor and the blades connected to the rotor such that air can be forced to travel in a downward direction by means of the blades rotating around the rotor, and the secondary lifting mechanism is a jet engine in the form of a turbofan that can be tilted so that exhaust gas from the turbofan can be forced in a downward direction behind the main body of the aircraft.

In another form of the aircraft the primary lifting mechanism is a turboprop which is positioned on the primary tilt enabling joint such that air can be forced in a downward direction by means of the blades of the turboprop, and the secondary lifting mechanism is a jet engine in the form of a turbojet that can be tilted so that exhaust gas from the turbojet can be forced in a downward direction behind the main body of the aircraft.

In another form of the aircraft the primary lifting mechanism is a turboprop which is positioned on the primary tilt enabling joint such that air can be forced in a downward direction by means of the blades of the turboprop, and the secondary lifting mechanism is a jet engine in the form of a turbofan that can be tilted so that exhaust gas from the turbofan can be forced in a downward direction behind the main body of the aircraft.

In another form of the aircraft the primary lifting mechanism comprises an engine assembly, a rotor, and blades connected to the rotor, with the engine assembly able to rotate the rotor and the blades connected to the rotor such that air can be forced to travel in a downward direction by means of the blades rotating around the rotor, and the secondary lifting mechanism comprises two jet engines that can be tilted so that exhaust gas from the jet engines can be forced in a downward direction behind the main body of the aircraft, with each jet engine being a turbojet.

In another form of the aircraft the primary lifting mechanism comprises an engine assembly, a rotor, and blades connected to the rotor, with the engine assembly able to rotate the rotor and the blades connected to the rotor such that air can be forced to travel in a downward direction by means of the blades rotating around the rotor, and the secondary lifting mechanism comprises two jet engines that can be tilted so that exhaust gas from the jet engines can be forced in a downward direction behind the main body of the aircraft, with each jet engine being a turbofan.

In another form of the aircraft the primary lifting mechanism is a turboprop which is positioned on the primary tilt enabling joint such that air can forced in a downward direction by means of the blades of the turboprop, and the secondary lifting mechanism comprises two jet engines that can be tilted so that exhaust gas from the jet engines can be forced in a downward direction behind the main body of the aircraft, with each jet engine being a turbojet.

In another form of the aircraft the primary lifting mechanism is a turboprop which is positioned on the primary tilt enabling joint such that air can forced in a downward direction by means of the blades of the turboprop, and the secondary lifting mechanism comprises two jet engines that can be tilted so that exhaust gas from the jet engines can be forced in a downward direction behind the main body of the aircraft, with each jet engine being a turbofan.

In one form of the aircraft where the primary lifting mechanism comprises an engine assembly, a rotor, and blades connected to the rotor, with the engine assembly able to rotate the rotor and the blades connected to the rotor such that air can be forced to travel in a downward direction by means of the blades rotating around the rotor, the engine assembly consists of a single engine.

In another form of the aircraft where the primary lifting mechanism comprises an engine assembly, a rotor, and blades connected to the rotor, with the engine assembly able to rotate the rotor and the blades connected to the rotor such that air can be forced to travel in a downward direction by means of the blades rotating around the rotor, the engine assembly consists of two engines.

In one form of the aircraft where the primary lifting mechanism comprises an engine assembly, a rotor, and blades connected to the rotor, and the engine assembly of the primary lifting mechanism consists of a single engine, a power transmission mechanism is connected to the engine of the primary lifting mechanism, by which power transmission mechanism the respective engine is able to rotate the rotor of the primary lifting mechanism.

In another form of the aircraft where the primary lifting mechanism comprises an engine assembly, a rotor, and blades connected to the rotor, and the engine assembly of the primary lifting mechanism consists of two engines, a power transmission mechanism is connected to the engines of the primary lifting mechanism, by which power transmission mechanism the engines of the primary lifting mechanism are able to rotate the rotor of the primary lifting mechanism.

The tilt enabling joints comprise various components. Some of the components are such that they hold the joint together while allowing the joint to have movement, forming a movement enabling assembly, while other components form an activating mechanism that can force movement between components of the movement enabling assembly.

In one form of the aircraft the movement enabling assembly of the primary tilt enabling joint is a universal joint and the activating mechanism comprises four of hydraulic actuators connected to the movement enabling assembly.

In another form of the aircraft the movement enabling assembly of the primary tilt enabling joint comprises two hinges transversely connected and the activating mechanism comprises four hydraulic actuators connected to the movement enabling assembly.

In one form of the aircraft the movement enabling assembly of the secondary tilt enabling joint is a universal joint and the activating mechanism comprises four hydraulic actuators connected to the movement enabling assembly.

In another form of the aircraft the movement enabling assembly of the secondary tilt enabling joint comprises two hinges transversely connected and the activating mechanism comprises four hydraulic actuators connected to the movement enabling assembly.

The secondary lifting mechanism is connected to secondary tilt enabling joint such that the secondary lifting mechanism can be rotated relative to secondary tilt enabling joint in a controlled manner without components of the secondary tilt enabling joint having to move with respect to one another. In a form of the aircraft this rotating ability is achieved by means of a rotation enabling connection in the form of a metal plate being used to join the secondary lifting mechanism to the upper section of the secondary tilt enabling joint with the metal plate being joined to the upper section of the secondary tilt enabling joint by means of a large rivet which protrudes from upper section of the secondary tilt enabling joint. A rotation inducing mechanism in the form of a hydraulically activated rotate-able arm is used to rotate the metal plate that the secondary lifting mechanism is attached to, with the hydraulically activated rotate-able arm connected to the upper section of the secondary tilt enabling joint.

FIG. 1 shows one form of the aircraft according to this invention. The aircraft has a main body 1 with a forward end 2 and an aft end 3. The primary lifting mechanism 4 comprises two blades 5, 6, connected to a rotor 7, which rotor 7 is rotated by means of an engine assembly 8 comprising one engine. The primary lifting mechanism 4 is connected to the top of the forward end 2 of the main body 1 by means of the primary tilt enabling joint 9 which has a movement enabling assembly in the form of a universal joint 10. A hydraulic actuator 11 is able to move the upper section 12 of the primary tilt enabling joint 9 forward and the hydraulic actuator 13 is able to move the upper section 12 of the primary tilt enabling joint in a rearward direction, while another hydraulic actuator 14 is connected to the main body 1 of the aircraft so that it is on the left side of the universal joint 10 and so that it is able to tilt a metal platform 15 which forms part of the universal joint 10 to the right side of the main body (Refer FIG. 3). Another hydralic actuator 16 is connected to the main body 1 of the aircraft so that it is on the right side of the universal joint and so that it can tilt the metal platform 15 to the left side of the main body of the aircraft. The hydraulic actuator 14 is positioned behind the universal joint 10 but is further forward on the main body than is the hydraulic actuator 16. The hydraulic actuators 14 and 16 are connected to the main body 1 and the metal platform 15 that forms part of the universal joint 10. The universal joint 10 of the primary tilt enabling joint 9 is formed by transversely connecting hinges 17 and 18 by means of the metal platform 15. The hydraulic actuators 11 and 13 are connected to the metal platform 15. The hydraulic actuator 11 is also connected to the upper section 12 of the primary tilt enabling joint 9, and the hydraulic actuator 13 is also connected to a protruding section of the hinge 17. The secondary lifting mechanism 19 comprises a jet engine. The jet engine is a turbojet. The jet engine 19 is connected to a hinge 20. The turbojet 19 is connected to a metal plate 21 that forms part of the hinge 20. A lower metal plate 22 forms part of the hinge 20. The lower metal plate 22 is connected to another hinge 23 that is positioned longitudinally on top of the main body 1. The hinges 20 and 23 are transversely connected. A hydraulic actuator 24 is connected to the metal plates 21 and 22 of hinge 20 such that when extending the hydraulic actuator 24 is able to tilt the turbojet 19 in a rearward direction by pushing the metal plate 21 in a rearward direction. The jet is able to tilt forward as the function of the hydraulic actuator 24 is reversed. The jet would have a tendency to tilt forward in the absence of the hydraulic actuator 24. A hydraulic actuator 25 is connected to a bent section of the lower metal plate 22. Another hydraulic actuator 26 is also connected to the bent section of the lower metal plate 22, and is connected to the aircraft so that it is on the right side of the lower hinge 23 such that it can tilt the lower plate 22 to the left side of the main body 1. The metal plates 21, 22, the hinges 20 and 23, the and the hydraulic actuators 24, 25, and 26 form the secondary tilt enabling joint 27. The jet engine 19 is shown to be behind the main body 1 of the aircraft angled such that it forces exhaust gas in a downward direction through the rear 28 of the turbojet 19. The primary lifting mechanism and the secondary lifting mechanism are arranged in tandem order. A turbofan jet engine could be used in place of the turbojet 19 positioned in the same manner as the turbojet 19. By using a wide metal plate 21, two jet engines could be attached to the metal plate 21. The lower hinge 23 is connected to the aft section of the main body 1. The jet engine 19 is attached to a another metal plate 29 which is connected to the metal plate 21 by means of a rivet 30, enabling the jet engine to be rotated relative to the secondary tilt enabling joint. A hydraulically activated rotating arm 31 is used to rotate the metal plate 29 with respect to the metal plate 21. The hydraulically activated rotate-able arm forms a rotation inducing mechanism, providing the means to cause rotation of the secondary lifting mechanism relative to the secondary tilt enabling joint. Hydraulic actuators 25 and 26 are connected to the main body. FIG. 1 also shows a fin 32 attached to the jet engine 19. The aircraft is fitted with wheel assemblies 33 and 34. Wings are fitted to the main body of the aircraft. FIG. 1 shows the position of a wing 35 on the left side of the main body of the aircraft.

Figure 2:
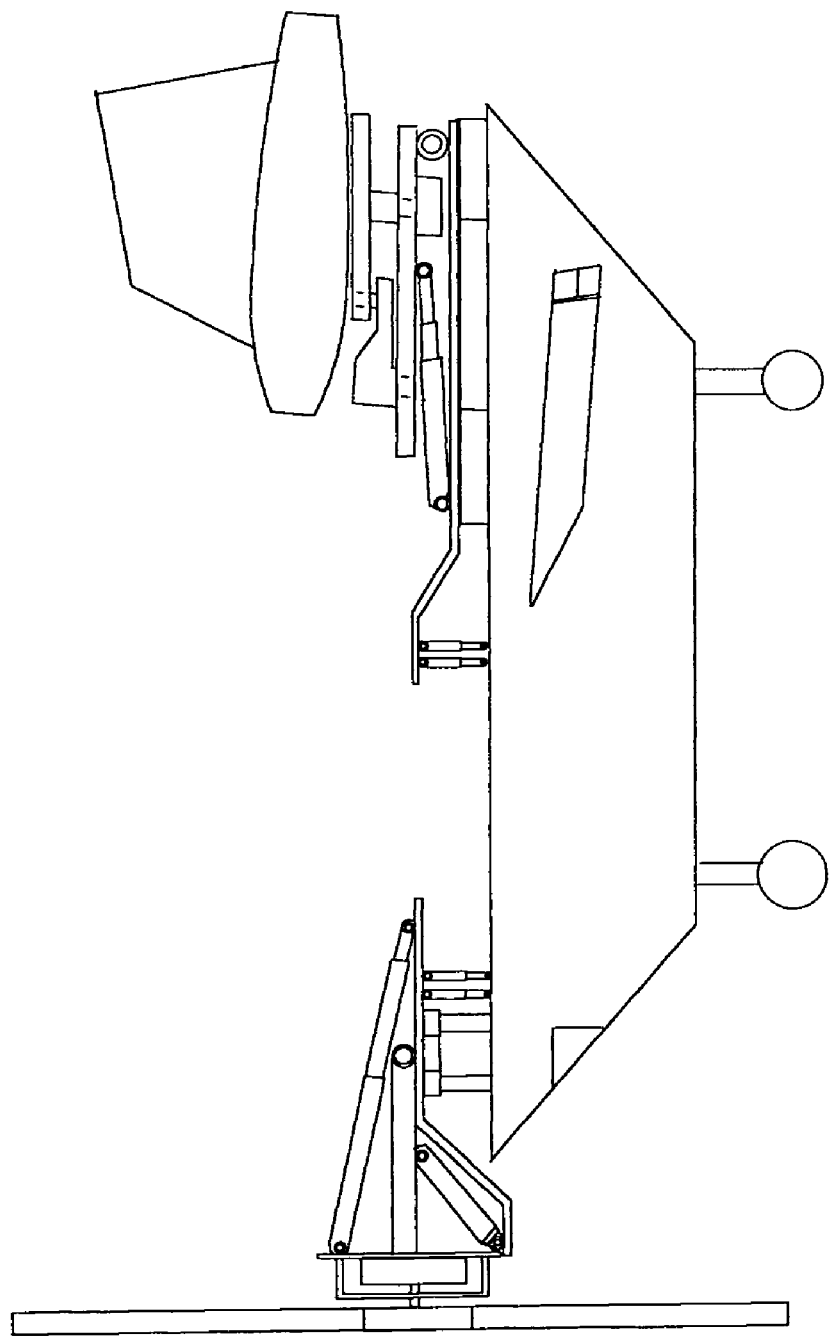
FIG. 2 shows the aircraft of FIG. 1 with the rotor at the front tilted forward and the jet at the rear tilted forward for high speed forward flight.

FIG. 2 shows the aircraft of FIG. 1 with the front rotor tilted forward and the jet at the rear tilted forward, so that the aircraft is able to fly forward at high speed.

Figure 3:
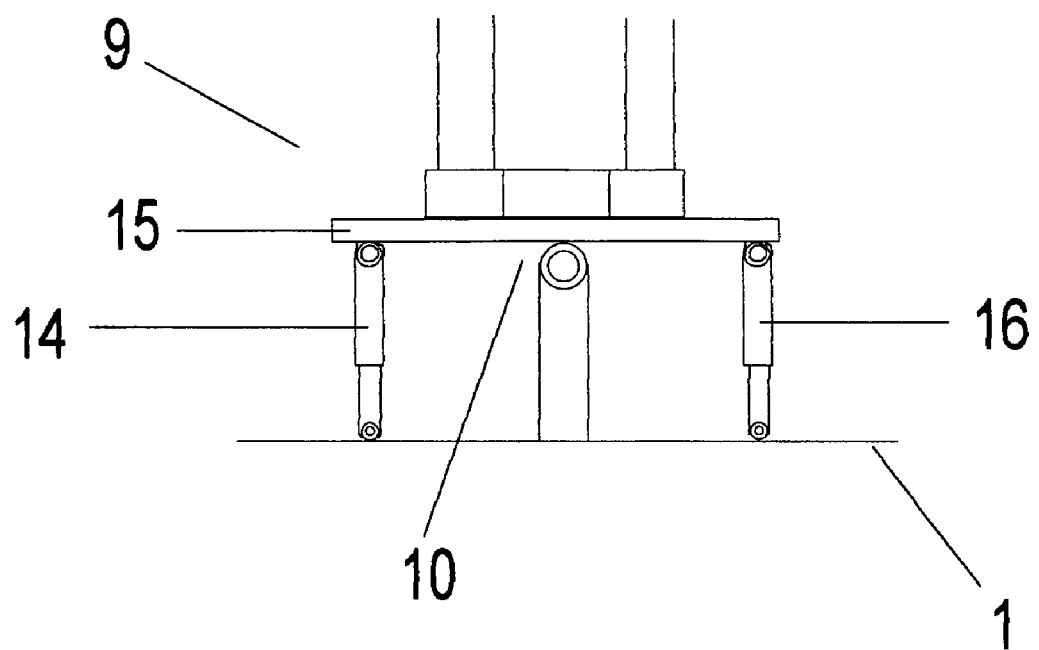
FIG. 3 shows the lower part of the tilt enabling joint that connects the forward rotor to the main body, as viewed from behind.

FIG. 3 shows the lower part of the primary tilt enabling joint 9 at the forward end of the main body 1 of the aircraft of FIG. 1. The view is from behind and shows the universal joint 10 as it would appear from behind, and the positioning of hydraulic actuators 14 and 16, with hydraulic actuator 14 to the left of the universal joint 10 and hydraulic actuator 16 to the right of the universal joint 10. The hydraulic actuators are connected to the metal plate 15 that forms part of the universal joint.

Figure 4:
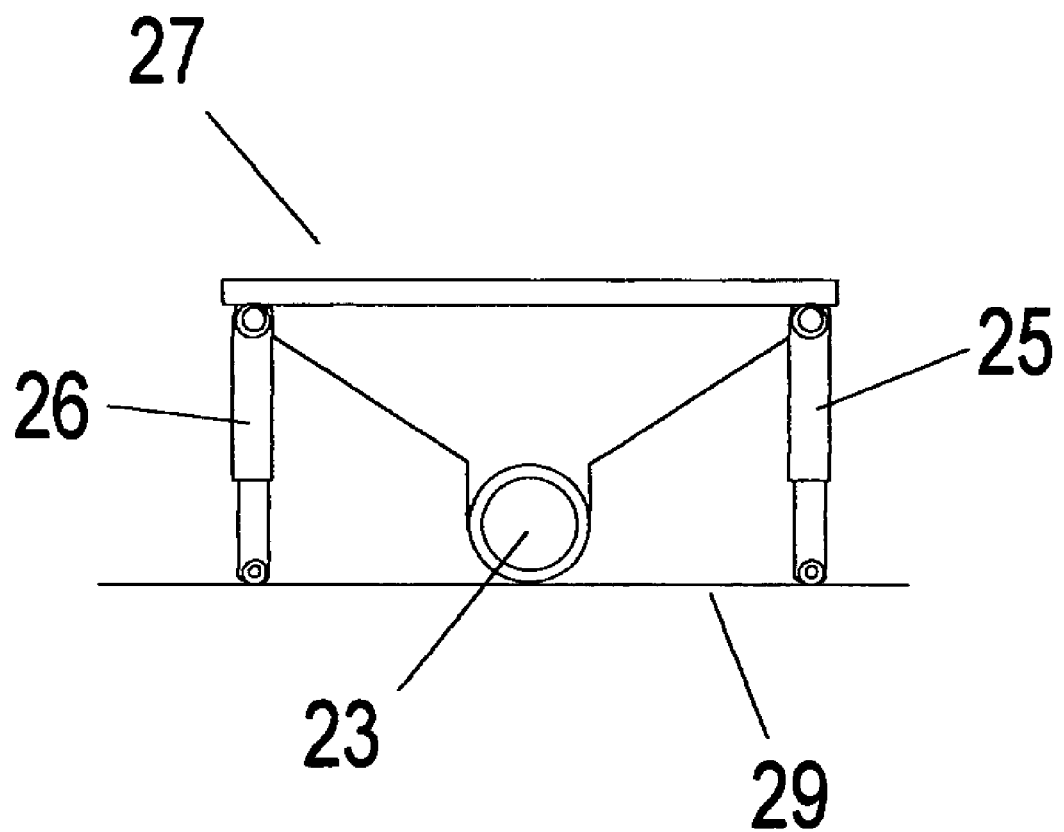
FIG. 4 shows the front of the lower part of the tilt enabling joint that joins the jet engine of FIG. 5 to the main body.

FIG. 4 shows the front of the lower part of the secondary tilt enabling joint 27 of FIG. 1 as viewed from in front of the secondary tilt enabling joint 27. FIG. 4 shows the lower hinge 23 connected to the main body of the 1, the hydraulic actuators 25 and 26 connected to the main body and the distancing of the hydraulic actuators 25 and 26 from the lower hinge 23.

Figure 5:
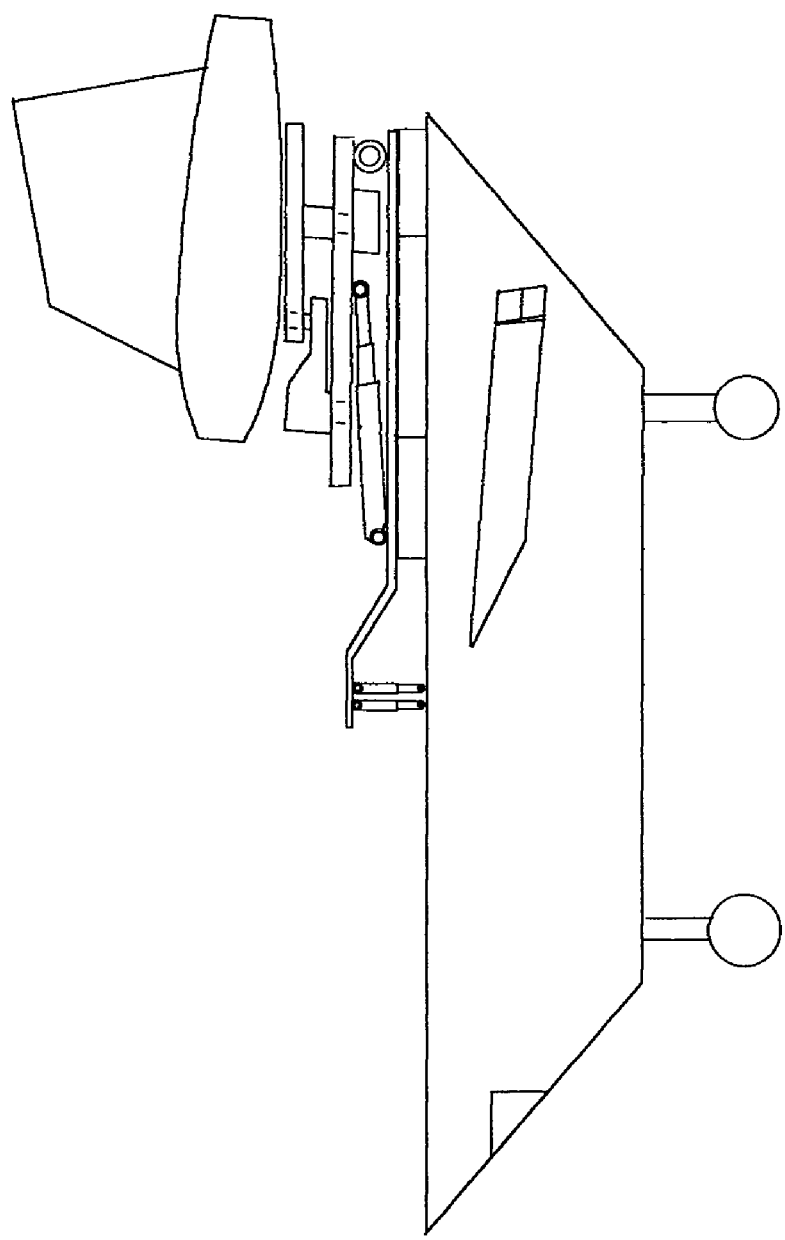
FIG. 5 shows the aircraft of FIG. 2 with the rotor at the front removed, showing how the aircraft could continue flying in a forward direction if the rotor at the front was destroyed by a heat seeking missile.

FIG. 5 shows the aircraft of FIG. 2 with the rotor at the front removed, showing how the aircraft could continue flying in a forward direction if the rotor at the front was destroyed by a heat seeking missile.

Figure 6:
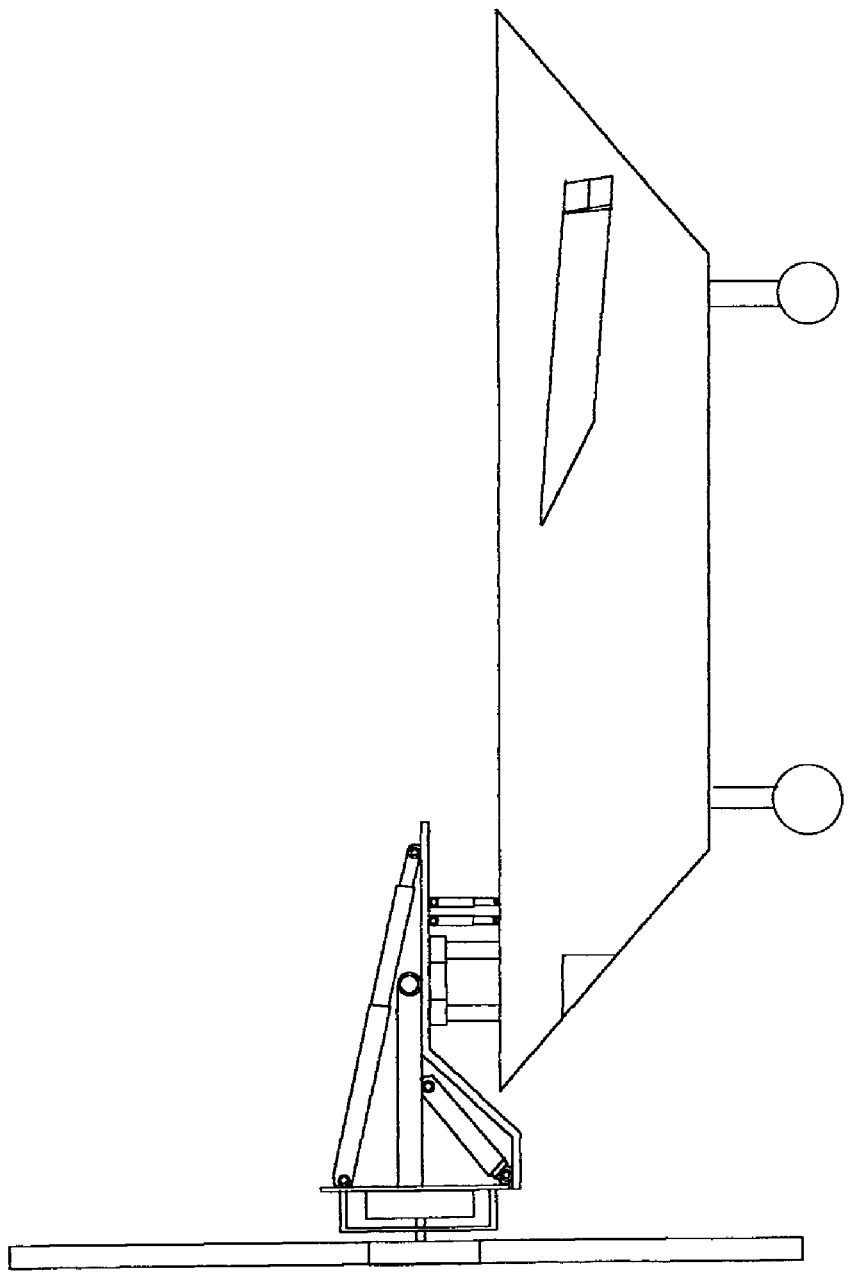
FIG. 6 shows the aircraft of FIG. 2 with jet at the rear removed, showing how the aircraft could continue flying in a forward direction if the jet at the rear was destroyed by a heat seeking missile.

FIG. 6 shows the aircraft of FIG. 2 with jet at the rear removed, showing how the aircraft could continue flying in a forward direction if the jet at the rear was destroyed by a heat seeking missile.

Figure 7:
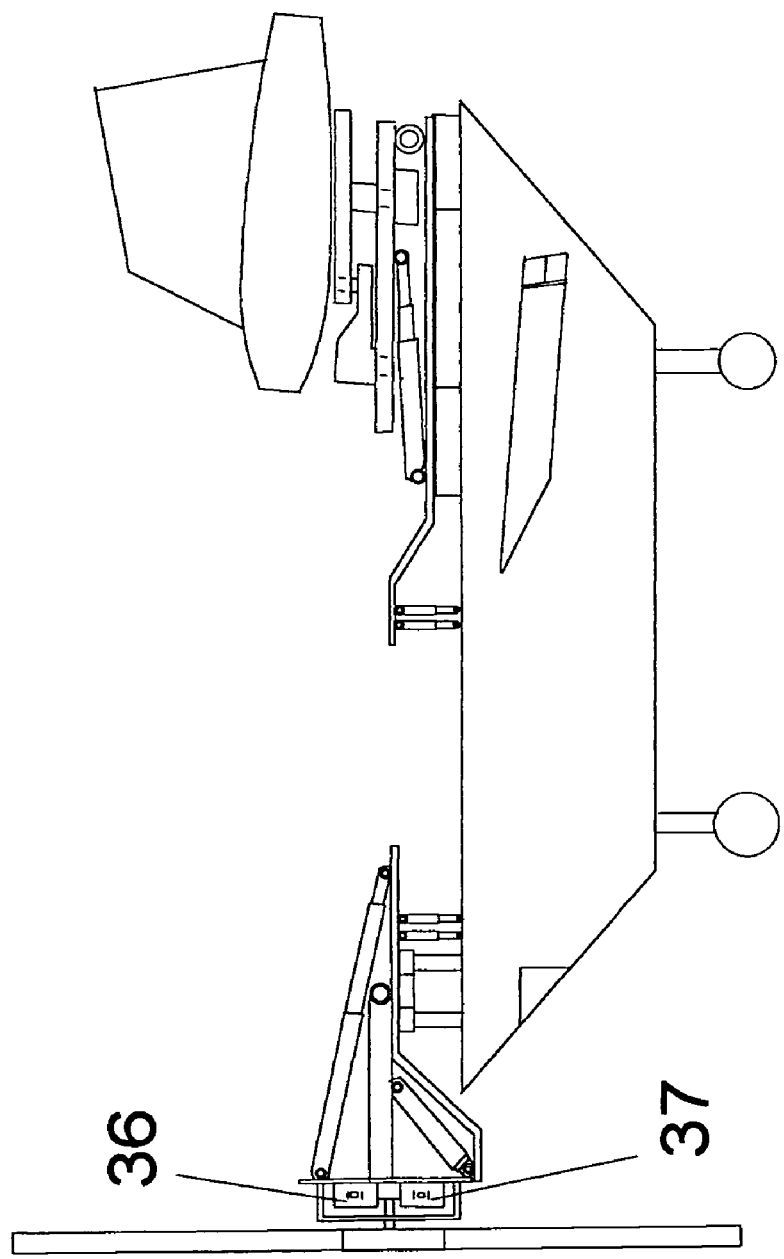
FIG. 7 shows a variation of the aircraft of FIG. 2, with two engines forming the forward engine assembly.

FIG. 7 shows a variation of the aircraft of FIG. 2, with two Engines 36 and 37 forming the engine assembly of the primary lifting mechanism.

FIG. 1 shows that the aircraft can take of and land vertically. FIG. 2 shows that the aircraft can also take off and land as a conventional forward flying airplane when fitted with wheels, wings, and when the tilt enabling joints have tilted the primary lifting mechanism and the secondary lifting mechanism forward. The aircraft could take-off while moving forward as an airplane and land as a helicopter, and vice versa.

What I claim as my invention is:

1. An aircraft comprising a main body, a primary lifting mechanism and a secondary lifting mechanism, said lifting mechanisms being located along the longitudinal centerline of said aircraft, which main body has a forward end and an aft end, with the primary lifting mechanism and the secondary lifting mechanism connected to the main body of the aircraft in tandem order, and with the aircraft able to achieve flight by means of upward forces exerted on the main body of the aircraft by the primary lifting mechanism and the secondary lifting mechanism while the primary lifting mechanism and the secondary lifting mechanism are connected to the main body of the aircraft in tandem order, and which primary lifting mechanism comprises a power plant as a means for providing downwardly extending thrust to the aircraft, and which secondary lifting mechanism comprises a power plant as a means for providing downwardly extending thrust to the aircraft, and which primary lifting mechanism is connected to the main body of the aircraft by a tilt enabling joint such that during flight of the aircraft the primary lifting mechanism can be tilted in a plurality of directions and angles relative to the main body of the aircraft, in a controlled manner, and such that the primary lifting mechanism can be tilted in forward, rearward and lateral directions relative to the main body of the aircraft during flight of the aircraft, in a controlled manner, and such that a direction of travel of the aircraft during flight can be altered by altering the lateral direction or angle of tilt of the primary lifting mechanism relative to the main body of the aircraft, which said tilt enabling joint is a primary tilt enabling joint, and which primary tilt enabling joint is connected to the main body of the aircraft, with the primary lifting mechanism able to exert an upward force on the forward end of the main body of the aircraft through the primary tilt enabling joint, and which secondary lifting mechanism is connected to an additional tilt enabling joint, which said additional tilt enabling joint is a secondary tilt enabling joint, and which said secondary tilt enabling joint is such that during flight of the aircraft the secondary lifting mechanism can be tilted in a plurality of directions and angles relative to the main body of the aircraft, in a controlled manner, and such that the secondary lifting mechanism can be tilted in forward, rearward and lateral directions relative to the main body during flight of the aircraft, in a controlled manner, by means of the secondary tilt enabling joint, and such that a direction of travel of the aircraft during flight can be altered by altering the lateral direction or angle of tilt of the secondary lifting mechanism relative to the main body, and which secondary tilt enabling joint is such that the secondary lifting mechanism can be tilted in a controlled manner in a lateral direction with respect to the main body of the aircraft during flight of the aircraft that is opposite to a lateral direction that the primary lifting mechanism can be tilted in with respect to the main body of the aircraft by means of the primary tilt enabling joint during flight of the aircraft, and which secondary lifting mechanism is able to exert an upward force on the aft end of the main body of the aircraft through the secondary tilt enabling joint, with the secondary lifting mechanism connected to the secondary tilt enabling joint by means such that the secondary lifting mechanism is able to be rotated relative to the secondary tilt enabling joint in a controlled manner, and with the aircraft able to achieve flight by means of an upward force exerted on the main body of the aircraft by the primary lifting mechanism extending thrust in a downward direction and an upward force exerted on the main body of the aircraft by the secondary lifting mechanism extending thrust in a downward direction while the primary lifting mechanism and the secondary lifting mechanism are maintained in tandem order, and with controlled lateral tilting of the primary lifting mechanism and the secondary lifting mechanism able to occur during flight.

2. An aircraft comprising a main body, a primary lifting mechanism and a secondary lifting mechanism, which main body has a forward end and an aft end, with the primary lifting mechanism and the secondary lifting mechanism connected to the main body of the aircraft in tandem order, and with the aircraft able to achieve flight by means of upward forces exerted on the main body of the aircraft by the primary lifting mechanism and the secondary lifting mechanism while the primary lifting mechanism and the secondary lifting mechanism are connected to the main body of the aircraft in tandem order, and which primary lifting mechanism comprises a rotor, an engine assembly, and a plurality of blades, with the said blades connected to the rotor, and which said engine assembly is able to rotate the said rotor, with the blades connected to the rotor such that when the rotor is rotated by the said engine assembly air can be forced in a downward direction by means of the blades rotating around the rotor, with the primary lifting mechanism able to exert an upward force on the forward end of the main body of the aircraft by forcing air in a downward direction by way of the blades rotating around the rotor, and which primary lifting mechanism is connected to the main body of the aircraft by a tilt enabling joint such that during flight of the aircraft the primary lifting mechanism can be tilted in a plurality of directions and angles relative to the main body of the aircraft, in a controlled manner, and such that the primary lifting mechanism can be tilted in forward, rearward and lateral directions relative to the main body of the aircraft during flight of the aircraft, in a controlled manner, and such that a direction of travel of the aircraft during flight can be altered by altering the lateral direction or angle of tilt of the primary lifting mechanism relative to the main body of the aircraft, which said tilt enabling joint is a primary tilt enabling joint, and which primary tilt enabling joint is connected to the main body of the aircraft, with the primary lifting mechanism able to exert an upward force on the forward end of the main body of the aircraft through the primary tilt enabling joint, and which secondary lifting mechanism is connected to an additional tilt enabling joint, which said additional tilt enabling joint is a secondary tilt enabling joint, and which said secondary tilt enabling joint is such that during flight of the aircraft the secondary lifting mechanism can be tilted in a plurality of directions and angles relative to the main body of the aircraft, in a controlled manner, and such that the secondary lifting mechanism can be tilted in forward, rearward and lateral directions relative to the main body during flight of the aircraft, in a controlled manner, by means of the secondary tilt enabling joint, and such that a direction of travel of the aircraft during flight can be altered by altering the lateral direction or angle of tilt of the secondary lifting mechanism relative to the main body, and which secondary tilt enabling joint is such that the secondary lifting mechanism can be tilted in a controlled manner in a lateral direction with respect to the main body of the aircraft during flight of the aircraft that is opposite to a lateral direction that the primary lifting mechanism can be tilted in with respect to the main body of the aircraft by means of the primary tilt enabling joint during flight of the aircraft, and the secondary lifting mechanism comprises at least one jet engine, which said at least one jet engine is attached to the secondary tilt enabling joint such that the said at least one jet engine is able to force exhaust gas from the at least one jet engine to travel in a downward direction and such that by forcing exhaust gas to travel in a downward direction the said at least one jet engine can exert an upward force on the aft end of the main body, and which secondary lifting mechanism is able to exert an upward force on the aft end of the main body of the aircraft through the secondary tilt enabling joint, with the secondary lifting mechanism connected to the secondary tilt enabling joint by means such that the secondary lifting mechanism is able to be rotated relative to the secondary tilt enabling joint in a controlled manner, and with the aircraft able to achieve flight by means of an upward force exerted on the main body of the aircraft by the primary lifting mechanism forcing air in a downward direction and an upward force exerted on the main body of the aircraft by the secondary lifting mechanism forcing exhaust gas to travel in a downward direction while the primary lifting mechanism and the secondary lifting mechanism are maintained in tandem order, and with controlled lateral tilting of the primary lifting mechanism and the secondary lifting mechanism able to occur during flight.

3. The aircraft of claim 2 wherein the said at least one jet engine is a turbojet.

4. The aircraft of claim 3 wherein the engine assembly of the primary lifting mechanism comprises a single engine.

5. The aircraft of claim 3 wherein the engine assembly of the primary lifting mechanism comprises a plurality of engines.

6. The aircraft of claim 2 wherein the said at least one jet engine is a turbofan.

7. The aircraft of claim 6 wherein the engine assembly of the primary lifting mechanism comprises a single engine.

8. The aircraft of claim 6 wherein the engine assembly of the primary lifting mechanism comprises a plurality of engines.

9. The aircraft of claim 2 wherein the engine assembly of the primary lifting mechanism comprises a single engine.

10. The aircraft of claim 2 wherein the engine assembly of the primary lifting mechanism comprises a plurality of engines.

11. An aircraft comprising a main body, a primary lifting mechanism and a secondary lifting mechanism, said lifting mechanisms being located along the longitudinal centerline of said aircraft, which main body has a forward end and an aft end, with the primary lifting mechanism and the secondary lifting mechanism connected to the main body of the aircraft in tandem order, and with the aircraft able to achieve flight by means of upward forces exerted on the main body of the aircraft by the primary lifting mechanism and the secondary lifting mechanism while the primary lifting mechanism and the secondary lifting mechanism are connected to the main body of the aircraft in tandem order, and which primary lifting mechanism is connected to the main body of the aircraft by a tilt enabling joint such that during flight of the aircraft the primary lifting mechanism can be tilted in a plurality of directions and angles relative to the main body of the aircraft, in a controlled manner, and such that the primary lifting mechanism can be tilted in forward, rearward and lateral directions relative to the main body of the aircraft during flight of the aircraft, in a controlled manner, and such that a direction of travel of the aircraft during flight can be altered by altering the lateral direction or angle of tilt of the primary lifting mechanism relative to the main body of the aircraft, which said tilt enabling joint is a primary tilt enabling joint, and which primary tilt enabling joint is connected to the main body of the aircraft, with the primary lifting mechanism able to exert an upward force on the forward end of the main body of the aircraft through the primary tilt enabling joint, and which secondary lifting mechanism is connected to an additional tilt enabling joint, which said additional tilt enabling joint is a secondary tilt enabling joint, and which said secondary tilt enabling joint is such that during flight of the aircraft the secondary lifting mechanism can be tilted in a plurality of directions and angles relative to the main body of the aircraft, in a controlled manner, and such that the secondary lifting mechanism can be tilted in forward, rearward and lateral directions relative to the main body during flight of the aircraft, in a controlled manner, by means of the secondary tilt enabling joint, and such that a direction of travel of the aircraft during flight can be altered by altering the lateral direction or angle of tilt of the secondary lifting mechanism relative to the main body, and which secondary tilt enabling joint is such that the secondary lifting mechanism can be tilted in a controlled manner in a lateral direction with respect to the main body of the aircraft during flight of the aircraft that is opposite to a lateral direction that the primary lifting mechanism can be tilted in with respect to the main body of the aircraft by means of the primary tilt enabling joint during flight of the aircraft, and which secondary lifting mechanism is able to exert an upward force on the aft end of the main body of the aircraft through the secondary tilt enabling joint, with the secondary lifting mechanism connected to the secondary tilt enabling joint by means such that the secondary lifting mechanism is able to be rotated relative to the secondary tilt enabling joint in a controlled manner, and with the aircraft able to achieve flight by means of an upward force exerted on the main body of the aircraft by the primary lifting mechanism through the primary tilt enabling joint and an upward force exerted on the main body of the aircraft by the secondary lifting mechanism through the secondary tilt enabling joint while the primary lifting mechanism and the secondary lifting mechanism are maintained in tandem order, and with controlled lateral tilting of the primary lifting mechanism and the secondary lifting mechanism able to occur during flight.

12. An aircraft comprising a main body, a primary lifting mechanism and a secondary lifting mechanism, which main body has a forward end and an aft end, with the primary lifting mechanism and the secondary lifting mechanism connected to the main body of the aircraft in tandem order, and with the aircraft able to achieve flight by means of upward forces exerted on the main body of the aircraft by the primary lifting mechanism and the secondary lifting mechanism while the primary lifting mechanism and the secondary lifting mechanism are connected to the main body of the aircraft in tandem order, and which primary lifting mechanism is connected to the main body of the aircraft by a tilt enabling joint such that during flight of the aircraft the primary lifting mechanism can be tilted in a plurality of directions and angles relative to the main body of the aircraft, in a controlled manner, and such that the primary lifting mechanism can be tilted in forward, rearward and lateral directions relative to the main body of the aircraft during flight of the aircraft, in a controlled manner, and such that a direction of travel of the aircraft during flight can be altered by altering the lateral direction or angle of tilt of the primary lifting mechanism relative to the main body of the aircraft, which said tilt enabling joint is a primary tilt enabling joint, and which primary tilt enabling joint is connected to the main body of the aircraft, which primary lifting mechanism is a turboprop, and which primary lifting mechanism is attached to the primary tilt enabling joint such that air can be forced in a downward direction by the primary lifting mechanism, and such that by forcing air in a downward direction the primary lifting mechanism is able to exert an upward force on the forward end of the main body of the aircraft, with the primary lifting mechanism able to exert an upward force on the forward end of the main body of the aircraft through the primary tilt enabling joint, and which secondary lifting mechanism is connected to an additional tilt enabling joint, which said additional tilt enabling joint is a secondary tilt enabling joint, and which said secondary tilt enabling joint is such that during flight of the aircraft the secondary lifting mechanism can be tilted in a plurality of directions and angles relative to the main body of the aircraft, in a controlled manner, and such that the secondary lifting mechanism can be tilted in forward, rearward and lateral directions relative to the main body during flight of the aircraft, in a controlled manner, by means of the secondary tilt enabling joint, and such that a direction of travel of the aircraft during flight can be altered by altering the lateral direction or angle of tilt of the secondary lifting mechanism relative to the main body, and which secondary tilt enabling joint is such that the secondary lifting mechanism can be tilted in a controlled manner in a lateral direction with respect to the main body of the aircraft during flight of the aircraft that is opposite to a lateral direction that the primary lifting mechanism can be tilted in with respect to the main body of the aircraft by means of the primary tilt enabling joint during flight of the aircraft, and the secondary lifting mechanism comprises at least one jet engine, which said at least one jet engine is attached to the secondary tilt enabling joint such that the said at least one jet engine is able to force exhaust gas from the at least one jet engine to travel in a downward direction and such that by forcing exhaust gas to travel in a downward direction the said at least one jet engine can exert an upward force on the aft end of the main body, and which secondary lifting mechanism is able to exert an upward force on the aft end of the main body of the aircraft through the secondary tilt enabling joint, with the secondary lifting mechanism connected to the secondary tilt enabling joint by means such that the secondary lifting mechanism is able to be rotated relative to the secondary tilt enabling joint in a controlled manner, and with the aircraft able to achieve flight by means of an upward force exerted on the main body of the aircraft by the primary lifting mechanism forcing air in a downward direction and an upward force exerted on the main body of the aircraft by the secondary lifting mechanism forcing exhaust gas to travel in a downward direction while the primary lifting mechanism and the secondary lifting mechanism are maintained in tandem order, and with controlled lateral tilting of the primary lifting mechanism and the secondary lifting mechanism able to occur during flight.

13. The aircraft of claim 12 wherein the said at least one jet engine is a turbojet.

14. The aircraft of claim 12 wherein the said at least one jet engine is a turbofan.

* * * * *